United States Patent
Colvard (10) Patent No.: US 6,692,185 B2
(45) Date of Patent: Feb. 17, 2004

(54) ADJUSTING ARRANGEMENT FOR STEERABLE TRANSPORT ASSEMBLY FOR SELF-PROPELLED CONSTRUCTION VEHICLE

(75) Inventor: John Charles Colvard, Wilkesboro, NC (US)

(73) Assignee: Power Curbers, Inc., Salisbury, NC (US)

( * ) Notice: Subject to any disclaimer, the term of this patent is extended or adjusted under 35 U.S.C. 154(b) by 72 days.

(21) Appl. No.: 09/982,151

(22) Filed: Oct. 17, 2001

(65) Prior Publication Data

US 2003/0072613 A1 Apr. 17, 2003

(51) Int. Cl.[7] .............................................. B62D 55/12
(52) U.S. Cl. ...................... 404/105; 180/9.44; 180/9.5; 180/411
(58) Field of Search ..................... 404/105; 180/9.44, 180/9.46, 9.5, 408, 411

(56) References Cited

U.S. PATENT DOCUMENTS

| | | | |
|---|---|---|---|
| 1,473,570 A | 11/1923 | Leyner | |
| 3,029,715 A | 4/1962 | Bowen | 94/46 |
| 3,175,478 A | 3/1965 | Smith | 94/46 |
| 3,257,917 A | 6/1966 | Lewis | 94/39 |
| 3,264,958 A | 8/1966 | Babb et al. | 94/46 |
| 3,292,511 A | 12/1966 | Cheney | 94/46 |
| 3,545,298 A | 12/1970 | Christofferson | 74/469 |
| 3,566,759 A | 3/1971 | Gurries | 94/46 |
| 3,572,458 A * | 3/1971 | Tax | 180/411 |
| 3,606,827 A | 9/1971 | Miller et al. | 94/46 |
| 3,635,131 A | 1/1972 | Larsen et al. | 94/46 |
| 3,637,026 A | 1/1972 | Snow | 172/4.5 |
| 3,674,094 A | 7/1972 | Kuntz | 172/4.5 |
| 3,709,116 A | 1/1973 | Whitbread et al. | 94/46 |
| 3,710,695 A | 1/1973 | Miller et al. | 94/46 |
| 3,749,504 A | 7/1973 | Smith | 404/84 |
| 3,750,063 A | 7/1973 | Lowen et al. | 335/206 |
| 3,771,892 A | 11/1973 | Munyon et al. | 404/84 |
| 3,792,745 A | 2/1974 | Files | 180/9.46 |
| 3,856,425 A | 12/1974 | Miller et al. | 404/84 |
| 3,900,077 A * | 8/1975 | Gee et al. | 180/9.46 |
| 3,970,405 A | 7/1976 | Swisher, Jr. et al. | 404/105 |
| RE28,979 E | 9/1976 | Long et al. | 172/4.5 |
| 4,029,165 A | 6/1977 | Miller et al. | 180/6.48 |
| 4,041,623 A | 8/1977 | Miller et al. | 37/108 R |
| 4,081,033 A | 3/1978 | Bulger et al. | 172/4.5 |
| 4,197,032 A | 4/1980 | Miller | 404/98 |
| 4,266,917 A | 5/1981 | Godbersen | 425/64 |
| 4,319,859 A | 3/1982 | Wise | 405/268 |
| 4,360,293 A | 11/1982 | Wade | 405/268 |
| 4,789,266 A | 12/1988 | Clarke, Jr. et al. | 404/96 |
| 4,808,026 A | 2/1989 | Clarke, Jr. et al. | 404/90 |
| 4,854,769 A | 8/1989 | Fukukawa et al. | 404/72 |
| 4,861,189 A | 8/1989 | Fukukawa et al. | 404/84 |
| 4,925,340 A | 5/1990 | Heiser et al. | 404/75 |
| 4,948,292 A | 8/1990 | Haven et al. | 404/84 |
| 5,009,546 A | 4/1991 | Domenighetti et al. | 404/110 |
| 5,044,820 A | 9/1991 | Prang | 404/84 |
| 5,101,360 A | 3/1992 | Bennett | 364/505 |

(List continued on next page.)

Primary Examiner—Gary S. Hartmann
(74) Attorney, Agent, or Firm—Kennedy Covington Lobdell & Hickman, LLP (57) ABSTRACT

An improved arrangement for adjusting crawler-type transport assemblies in a self-propelled construction vehicle between two differing "home" positions. The crawler transport assembly comprises a steering mechanism including a collar assembly operated via an actuator mounted to the frame of the apparatus for driving steering rotation of the transport assembly via the collar assembly. The collar assembly comprises a driving element integrally coupled to the actuator and a driven element integrally coupled to the transport assembly. The driven element can be affixed to the driving element selectively in two differing dispositions corresponding to the two "home" positions of the transport assembly.

16 Claims, 6 Drawing Sheets

U.S. PATENT DOCUMENTS

| | | | |
|---|---|---|---|
| 5,201,603 A | 4/1993 | Bassett et al. | 404/84.1 |
| 5,356,238 A | 10/1994 | Musil et al. | 404/84.1 |
| 5,362,176 A | 11/1994 | Sovik | 404/72 |
| 5,401,115 A | 3/1995 | Musil et al. | 404/72 |
| 5,549,412 A | 8/1996 | Malone | 404/84.1 |
| 5,568,992 A | 10/1996 | Grembowicz et al. | 404/101 |
| 5,590,977 A | 1/1997 | Guntert et al. | 404/101 |
| 5,599,134 A | 2/1997 | Macku et al. | 404/84.1 |
| 5,662,431 A | 9/1997 | Colvard | 404/105 |
| 6,050,355 A | 4/2000 | Beck, Jr. | 180/9.62 |
| 6,109,825 A | 8/2000 | Yon | 404/84.05 |
| 6,116,362 A | 9/2000 | Schubert et al. | 180/9.44 |
| 6,286,615 B1 | 9/2001 | Bitelli | 180/9.46 |
| 6,481,924 B1 * | 11/2002 | Smolders et al. | 404/105 |

* cited by examiner

ADJUSTING ARRANGEMENT FOR STEERABLE TRANSPORT ASSEMBLY FOR SELF-PROPELLED CONSTRUCTION VEHICLE

BACKGROUND OF THE INVENTION

The present invention relates generally to self-propelled construction equipment and, more particularly, to a self-propelled construction vehicle having a steerable transport assembly which is selectively adjustable for operation of the vehicle in two transverse, preferably perpendicular, transport directions.

Self-propelled construction vehicles and other construction equipment of diverse types are well known. One type of such construction equipment are so-called slip-form paving machines essentially adapted to continuously form concrete or another flowable paving material along the ground or other base surface, for example, to form a roadway. Diverse forms of such machines have been described in prior patents, representative examples of which may be found in U.S. Pat. Nos. 3,175,478; 3,264,958; 3,637,026; 3,771,892; 3,970,405; 4,197,032; 4,360,293; 4,925,340; 4,948,292; 5,044,820; and 5,590,977.

Conventionally, it is commonplace for paving equipment of this type to support the machine frame on a plurality of so-called crawler track assemblies, typically four such assemblies mounted in laterally and longitudinally spaced relation to one another at four corners of the machine frame, with each assembly having an endless ground-engaging self-propelled track supported by an associated steering mechanism for pivotable steering movement about a vertical steering axis which thereby facilitates steerable driving of the paving machine over substantially any ground surface along which a roadway is to be paved. The frame of the machine supported by the crawler assemblies may have various devices and mechanisms to perform various functions, including a substantially horizontally disposed undersurface, commonly referred to as a screed, for purposes of leveling and finishing concrete material. In basic operation, a continuous supply of concrete or other suitable paving material is deposited in front of the paving machine between its laterally spaced crawler assemblies as the machine is driven over the intended path of the roadway, whereby the concrete material is spread, leveled and finished by the screed.

In some currently conventional machines, the crawler assemblies may be movable between a forwardly oriented (i.e. front-to-back) "home" position, while being steerable within a designated range from the home position, for driving the machine forwardly relative to the longitudinal extent of the frame, and a laterally oriented (i.e. side-to-side) "home" position, while also being steerable within a designated range from the home position, for driving the paving machine laterally, which optimally facilitates driving transport and movement of the machine from one location to another. Such movability in the "home" orientation of the crawler assemblies is particularly beneficial in larger paving equipment, such as equipment wherein the lateral spacing between the crawler assemblies is set so as to facilitate the paving simultaneously of two lanes of roadway side-by-side. Because of the substantial width of machines of this size, they cannot always be driven in a forward direction. For example, for purposes of transport from one location to another, such machines must be of a longitudinal front-to-back dimension which can be supported on a conventional flat-bed truck for transport over public highways and roads. Hence, such machines must be drivable in a lateral direction for loading onto and off of a transport trailer.

Some prior paving machines have steerable crawler assemblies equipped to be adjustably switchable between forward and lateral "home" steering positions, but the mechanical arrangement for switching from one home position to the other home position is disadvantageously complicated and time consuming to accomplish. Steering of the crawler assemblies in such machines is commonly accomplished via a hydraulic piston-and-cylinder assembly extending from the machine frame to the crawler assembly for actuating pivoting movements of the crawler assembly about the vertical steering axis. In order to switch each crawler assembly from one home position to the other home position, the connection between the steering piston-and-cylinder assembly is operated to turn the crawler assembly about ninety (90) degrees into the new home position, and then the piston-and-cylinder assembly is disconnected and re-connected to a different mounting location on the crawler assembly. In conventional practice, this operation is time consuming and labor intensive to accomplish, even assuming no difficulty in aligning the steering piston-and-cylinder assembly with the crawler assembly for reconnection, and then the adjustment operation must be re-performed once the machine has been moved to a new position or a new paving location.

Other paving machines are known which have steerable crawler assemblies which may be moved between forward and lateral "home" steering positions without the necessity of disconnecting and reconnecting any components of the steering arrangement. One such paving machine is disclosed in U.S. Pat. No. 5,590,977, wherein the steering arrangement is capable of moving the crawler assemblies through a range of motion greater than ninety (90) degrees without any reconfiguration of the steering arrangement. Disadvantageously, however, in order for the steering arrangement to have a desirable range of steering motion in the forward "home" position, yet still be movable approximately ninety (90) degrees into a lateral "home" position, the mechanical limitations of the steering arrangement enable only a much more limited range of steering motion with the crawler assemblies in the lateral "home" position which limits the usefulness and maneuverability of the machine in transverse steering operation. Other known conventional paving machines utilize a structure supporting the steered crawler assemblies commonly referred to as a "swinging leg" arrangement which rotates about a pin at the main frame of the machine. Such steering arrangements also are capable of moving the crawler assemblies through a range of motion greater than ninety (90) degrees so as to be capable of orienting the crawler assemblies in both forward and lateral "home" positions with a reasonable range of steering motion in each such position. However, upon switching between differing "home" positions, the steering and propulsion hydraulic systems for the paving machine must be modified to allow proper operation in the new direction of travel, all of which tends to be very time consuming to accomplish.

Accordingly, it would be highly desirable to provide a more automated, simplified and streamlined means for easily switching a crawler assembly from one "home" steering position to another, so as to improve the efficiency and usefulness of the machine.

SUMMARY OF THE INVENTION

It is accordingly an object of the present invention to provide an improved mechanical arrangement for changing a crawler assembly or other form of transport assembly, such as on a self-propelled construction vehicle, from one "home" steering position to another, which can be performed much more easily and quickly than with the conventional adjusting means described above and which otherwise overcomes the disadvantages of the known conventional arrangement.

Briefly summarized, the present invention is basically applicable to any self-propelled construction or like vehicle having a frame supported on a steerable transport assembly comprising a ground-engaging structure, such as an endless track crawler assembly, depending from a steering mechanism moveable within a defined range of steering relative to a generally vertical steering axis. The steering mechanism will typically comprise an upstanding post integrally coupled to the ground engaging structure for unitary rotation thereof about the steering axis and a steering control assembly comprising a collar assembly coupled to the post and an actuator mounted to the frame and coupled to the collar assembly for driving rotation of the collar assembly and the post selectively in opposite rotational directions.

In accordance with the present invention, the collar assembly basically comprises a driving collar element integrally coupled to the actuator and a driven collar element integrally coupled to the post. The driven collar element is affixable to the driving collar element selectively in a first disposition relative to the driving collar element for orienting the post and the ground engaging structure for steering the vehicle in a first transport direction and in a second disposition relative to the driving collar element for orienting the post and the ground engaging structure angularly spaced from the first disposition for steering the vehicle in a second transport direction.

In a preferred embodiment, the driving and driven collar elements are disposed for relative rotation about the steering axis between the first and second dispositions when not affixed to one another. More specifically, the driving collar element preferably is disposed annually about the driven collar element for relative rotation therebetween. The driving collar preferably has two coupling locations angularly spaced from one another and the driven collar element has a coupling location adapted for affixation selectively to either of the coupling locations of the driving collar element. The actuator preferably is operable in each of the first and second dispositions of the collar elements for driving rotation of the collar assembly within a defined range for steering of the vehicle in a selected one of the transport directions. The upstanding post preferably is extendable for selectively controlling elevation of the ground engaging structure relative to the frame. Typically, the vehicle will comprise a plurality of the steerable transport assemblies, e.g. four such assemblies spaced laterally and longitudinally with respect to one another, and a steering control system for coordinated movement of the transport assemblies.

The present invention is particularly adapted for use in a construction vehicle of the type configured for slip-forming a paving material along a ground surface, e.g., a roadway, as the vehicle is steered in a selected one of the transport directions.

Other details, features and advantages of the invention will be described and understood from a description of a preferred embodiment of the invention set forth below with reference to the accompanying drawings.

DETAILED DESCRIPTION OF THE PREFERRED EMBODIMENT

Figure 1:
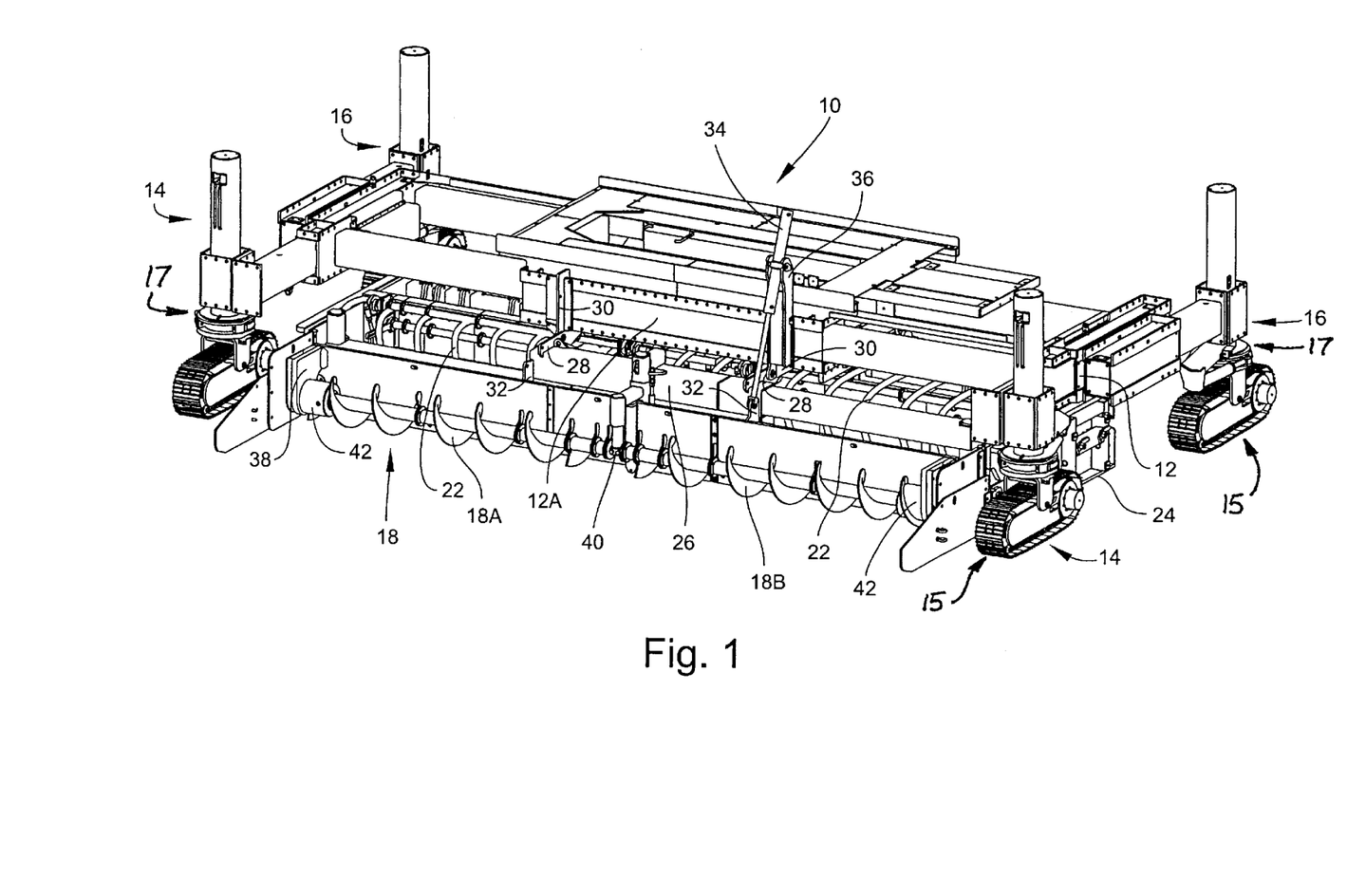
FIG. 1 is a front perspective view of a slip-form paving apparatus equipped with adjustably switchable transport assemblies, each with a steerable endless track crawler assembly, in accordance with the present invention.
Figure 2A:
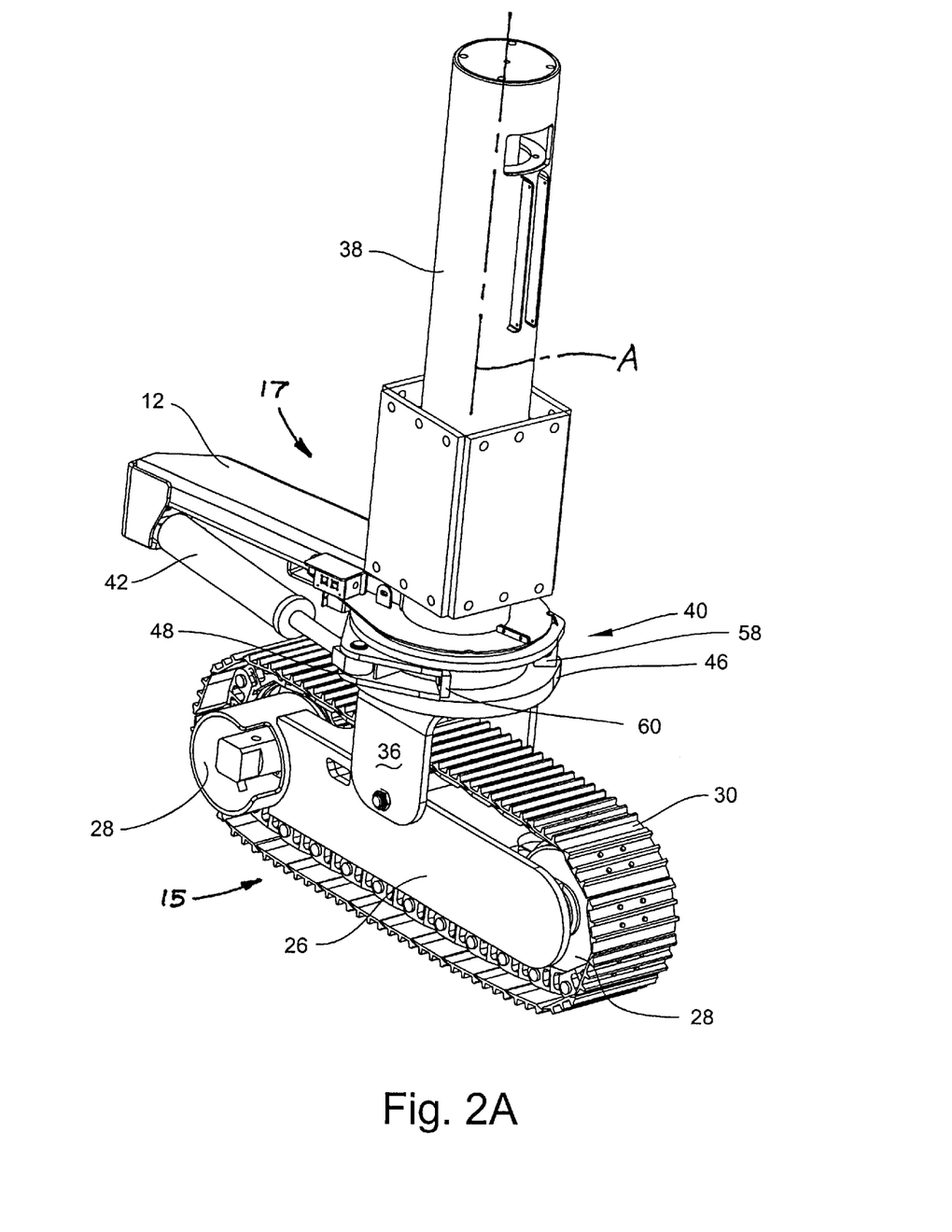
FIGS. 2A and 2B are perspective views of one of the transport assemblies of the paving apparatus of FIG. 1 disposed in one "home" orientation for steerable forward travel of the paving apparatus.
Figure 2B:
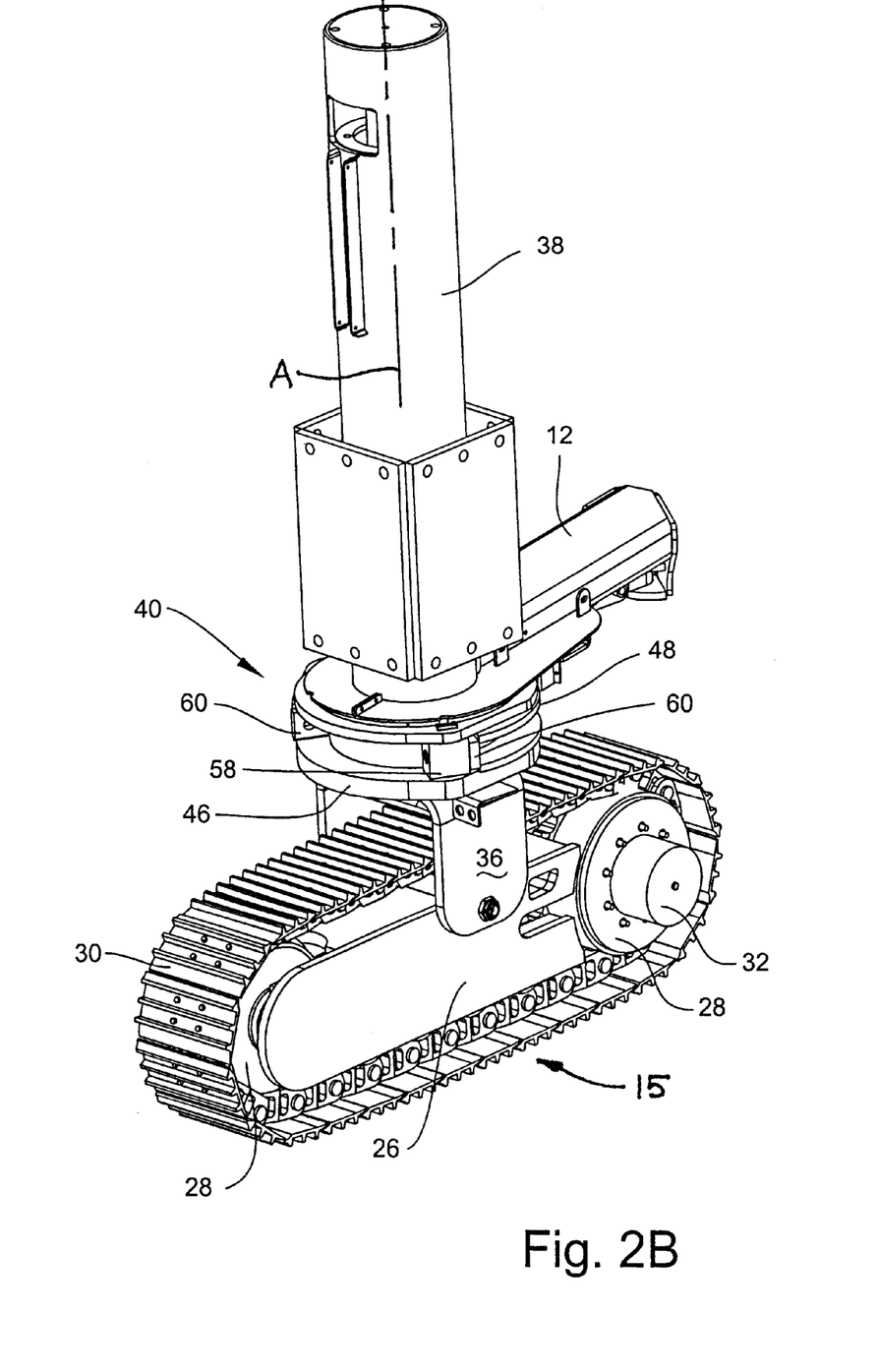
Figure 3A:
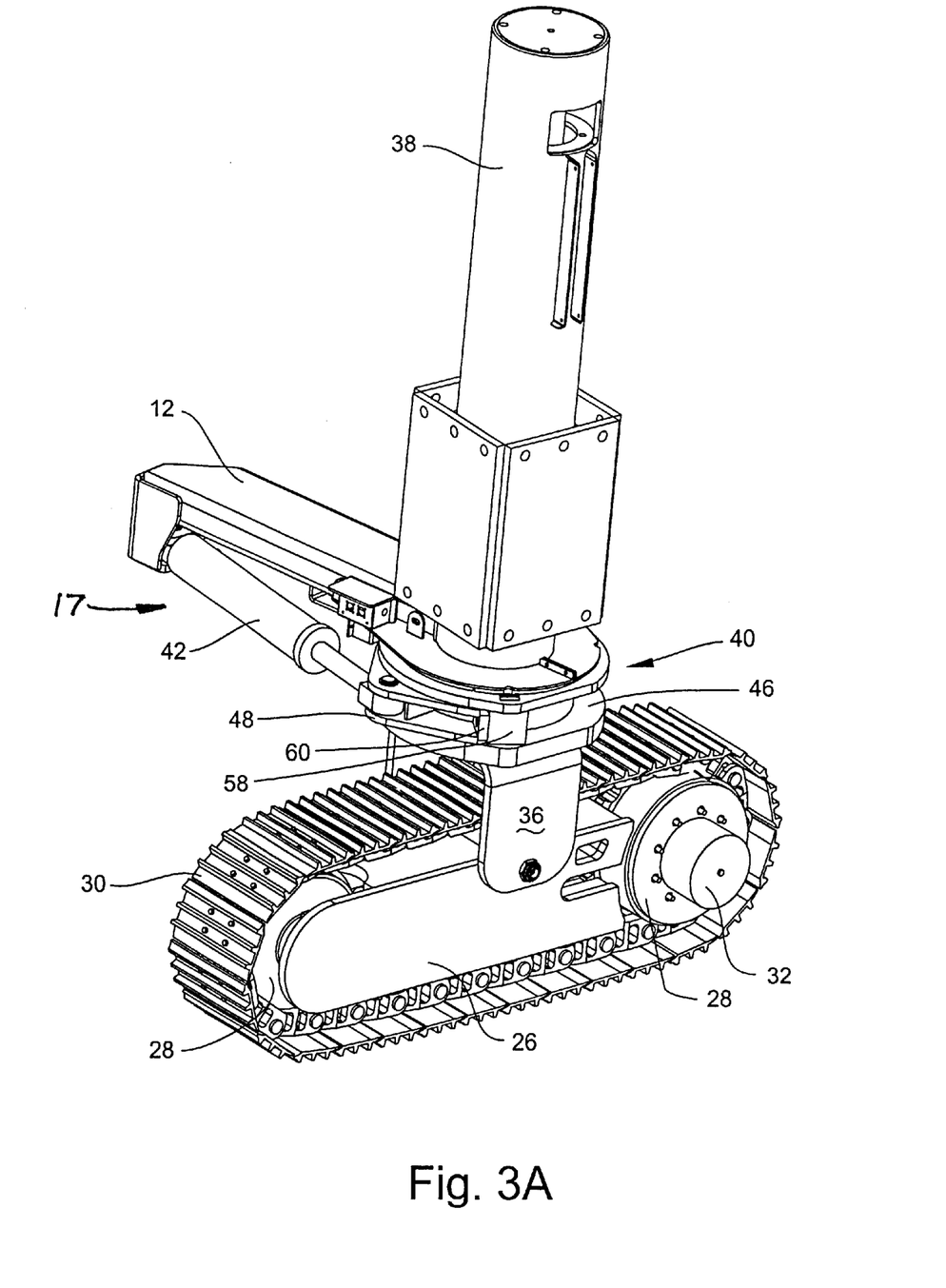
FIGS. 3A and 3B are additional perspective views of the transport assembly of FIGS. 2A and 2B, but disposed in a second "home" orientation for lateral travel of the paving apparatus.
Figure 3B:
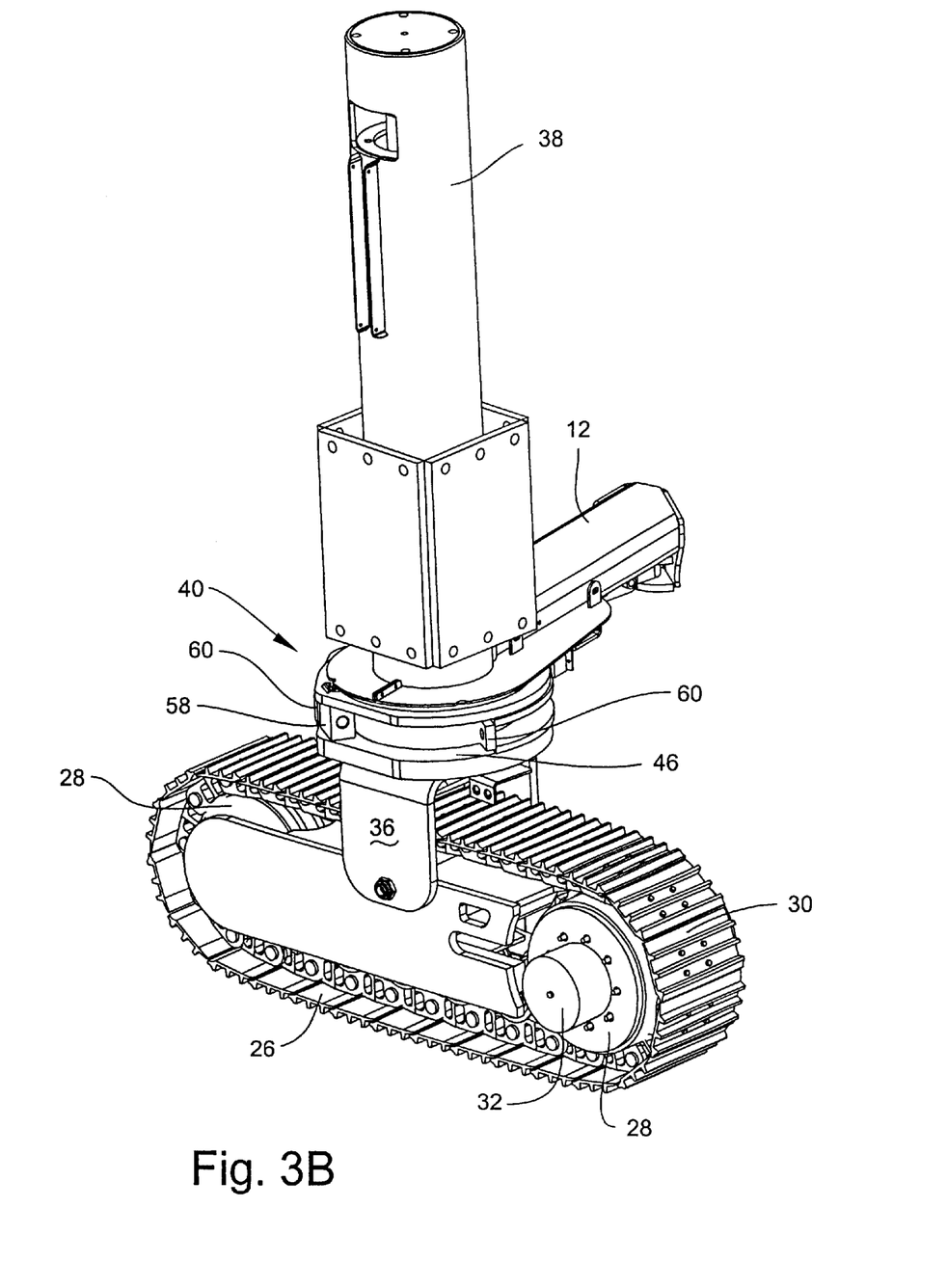

Referring now to the accompanying drawings and initially to FIG. 1, a self-propelled slip-form paving apparatus in accordance with the present invention is indicated in its totality at 10. The paving apparatus 10 basically comprises a structural framework 12 supported substantially horizontally on four front and rear transport assemblies 14, 16 disposed at the four corners of the structural framework 12 in laterally and longitudinally spaced relation to provide stable suspension of the framework 12, and each preferably comprising a so-called crawler assembly 15 of the endless track type depending from a steering mechanism 17 movable within a defined range relative to a vertical steering axis A. An internal combustion engine (not shown) or other suitable self-contained power generator, preferably in conjunction with a hydraulic pump (also not shown), is mounted to the structural framework 12 to provide drive power to the transport assemblies 14, 16 and to otherwise supply operational power to the various systems of the paving apparatus in a known manner.

The embodiment of the paving apparatus 10 depicted in the accompanying drawings is particularly adapted for use in road construction for the continuous slip-form paving of a slab-type concrete roadway, the lateral width of the apparatus 10 between the front and rear transport assemblies 14, 16 being sufficient for the formation simultaneously of two road lanes side-by-side one another. However, as those persons skilled in the art will understand, the essential features and inventive concepts forming the present invention are equally well-adapted to substantially any other form of self-propelled construction apparatus having a frame supported on a transport assembly or assemblies equipped with crawler or other steerable drive assemblies.

The paving apparatus 10 is equipped with a screw-type auger assembly 18 transversely spanning the framework 12 at the forward leading side thereof and selectively driveable in opposite rotational directions, for laterally distributing a supply of concrete, or another suitable flowable paving material, deposited in front of the apparatus across the ground structure over which the roadway is to be paved. Immediately rearwardly of the auger assembly 18, a vertically disposed plate 20, commonly referred to as a strike-off plate, is supported by the framework 12 with a lower edge of the plate 20 extending laterally across substantially the full width of the apparatus 10 at an elevation essentially corresponding to the desired elevation to which the roadway slab is to be paved, to act as a metering gate controlling the level of concrete material passing underneath the strike-off plate 20. A series of vibratory devices, only partially visible at 22 in FIG. 1, are mounted to the framework 12 at regular spacings across the transverse width of the paving apparatus 10 immediately behind the strike-off plate 20 to further assist in the leveling and settlement of the distributed concrete material by imposing a rigorous vibratory action on the concrete material passing under the strike-off plate 20. A finish screed 24 (also known as a finishing pan) is disposed rearwardly of the vibratory devices 22 and is preferably in the form of a substantially horizontal plate extending transversely across the width of the paving apparatus 10 and rearwardly from the vibratory devices 22.

The front and rear transport assemblies 14, 16 not only provide motive power for propelling the paving apparatus 10, but also provide for directional steering of the paving apparatus 10. As best seen in FIGS. 2A, 2B, 3A, 3B and 4, the crawler assembly 15 of each of the transport assemblies 14, 16 basically comprises a crawler sub-frame 26 supporting a pair of horizontally spaced sprockets 28 (or a sprocket and roller combination) carrying an endless track 30 thereabout with an individual hydraulic motor 32 for driving rotation of the sprockets 24 and, in turn, travelling movement of the track 30. The crawler assembly 15 is suspended from the framework 12 of the paving apparatus 10 by the steering mechanism 17 which has a vertically upstanding post 34 affixed to the crawler subframe 26 by a clevis bracket 36 and supported for vertical sliding movement within an annularly encircling upstanding sleeve assembly 38 which is fixedly carried by the structural framework 12 of the apparatus 10. For purposes of rotationally steering the crawler assembly, the post 34 is of a substantially square horizontal cross-section and extends through a correspondingly square opening formed centrally within a collar assembly 40 rotatably supported on the lower end of the sleeve assembly 38, whereby rotation of the collar assembly 40 is transmitted to the post 34 about a vertical steering axis extending centrally through the post 34 and the collar assembly 40. Rotational steering movement of the crawler assembly 15 is driven by an extensible and retractable linear actuator preferably in the form of a hydraulic piston-and-cylinder assembly 42 extending between a portion of the structural framework 12 of the apparatus 10 which is integral with the sleeve assembly 38 and the collar assembly 40. Vertical sliding movement of the post 34 within the sleeve assembly 38 is controlled by another linear actuator also preferably in the form of a second hydraulic piston-and-cylinder assembly 44 affixed at one end within the post 34, extending vertically therethrough, and affixed at its opposite end to the upper end of the sleeve assembly 38.

As depicted in FIG. 1, the front and rear transport assemblies 14, 16 are disposed during normal paving operation of the apparatus 10 with the crawler assemblies 15 oriented to extend in the longitudinal direction of the apparatus 10, i.e., in a front-to-rear orientation. In such disposition of each transport assembly 14, 16, the crawler assembly 15 thereof assumes a "home" position wherein the crawler subframe 26 and its track 30 extend in parallel relation to the longitudinal front-to-rear extent of the framework 12, when the respective steering piston-and-cylinder assembly 42 is disposed with the piston essentially at the midpoint within its range of permissible extension and retraction, whereby each transport assembly 14, 16 can be steered within a predetermined range of rotational movement about its vertical steering axis A by increased extension or retraction of the piston within the piston-and-cylinder assembly 42. Steering operation is controlled by a machine operator from an operator support platform (not indicated) via a centralized steering control system which coordinates the steering rotation of the transport assemblies 14, 16 in synchronism with one another.

Thus, the basic operation of the paving apparatus 10 will be understood. As the paving apparatus 10 is self-propelled via the front and rear transport assemblies 14, 16 on the ground surface over which the roadway slab is to be formed, a suitable supply of concrete is maintained continuously in front of the auger assembly 18. The operator of the paving apparatus 10 actuates and deactuates the auger assembly 18 in either direction as necessary to distribute the concrete material with general uniformity laterally across the forward side of the paving apparatus. As the paving apparatus 10 advances, the vertically-disposed plate 20 strikes off a limited amount of the concrete material, following which the vibratory devices 22 serve to expel any air bubbles from the concrete material and to further smooth the upward surface of the concrete material. As the paving apparatus 10 continues to advance forward, the screed 24 is then drawn over the vibrated depth of the concrete material, performing a final compacting and smoothing of its upper surface.

However, it is also necessary under other circumstances than the normal paving operation of the apparatus 10 for the apparatus to be propelled in a lateral direction essentially perpendicular to the normal direction of transport during paving operations. For such purpose, the transport assemblies 14, 16 most be switched to a second "home" position spaced substantially ninety degrees from the first "home" position described above, wherein the crawler assemblies 15 extend perpendicularly to the longitudinal front-to-rear extent of the framework 12. To do so conventionally, each steering piston-and-cylinder assembly 42 must be disconnected from its respective transport assembly 14, 16, then the respective transport assembly 14, 16 turned substantially ninety degrees into the second "home" position, and finally each steering piston-and-cylinder assembly 42 reconnected to its respective transport assembly 14, 16 at a different location thereon at which the piston will be at the midpoint within its range of extension/retraction movements. As will be appreciated, the overall operation is not only quite time consuming and labor intensive but also can be problematic to actually accomplish because of the close alignment which must be accomplished between the piston-and-cylinder assembly 42 and its transport assembly 14, 16 in order to make the reconnection therebetween.

Figure 4:
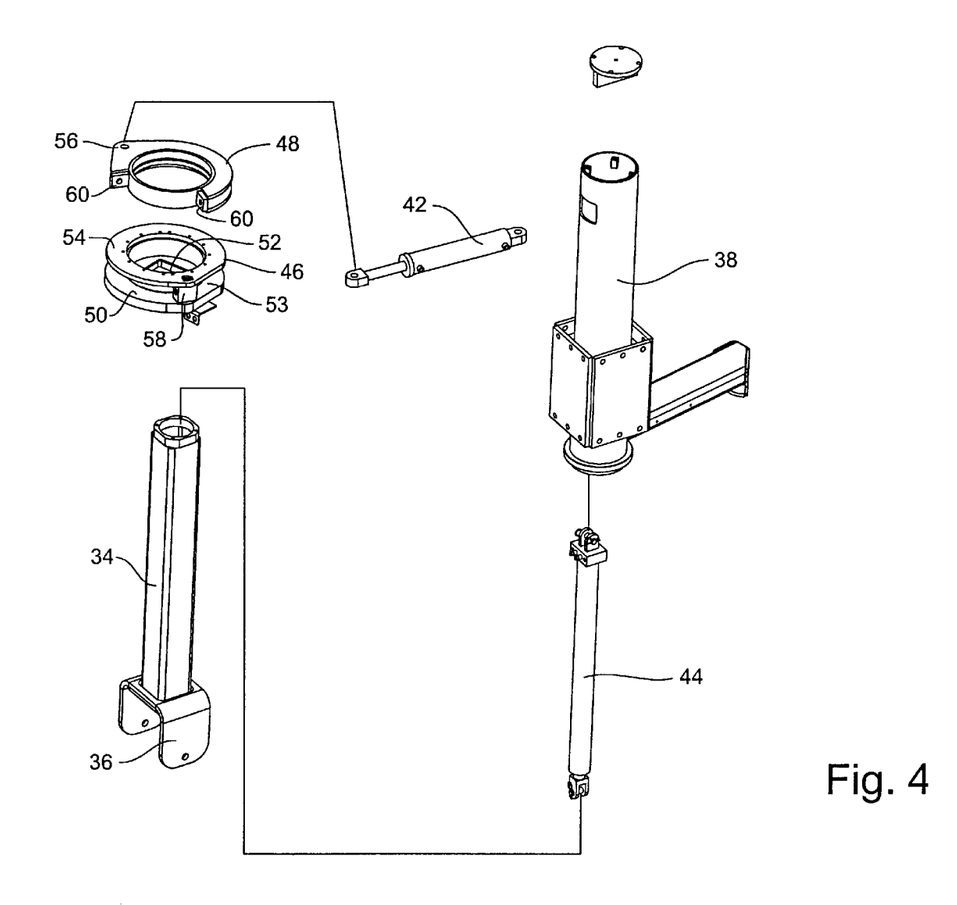
FIG. 4 is an exploded perspective view of the crawler assembly and the steering mechanism of the transport assembly of FIGS. 2A, 2B, 3A and 3B.

Accordingly, in order to substantially simplify and shorten the time required for switching the transport assemblies 14, 16 between their two respective "home" positions, the present invention provides a novel and unique form of the collar assembly 40 which eliminates the conventionally necessity of disconnecting the piston-and-cylinder assembly 42. Specifically, as best seen in FIG. 4, the collar assembly 40 basically comprises two relatively rotatable collar elements 46, 48. The collar element 46 is rotatably disposed as above-described about the lower end of the sleeve assembly 38 and carries a laterally extending base plate 50 formed with the square opening 52 through which the post 34 extends, thereby for integral rotational movement of the collar element 46 and the post 34 and, in-turn, of the crawler subframe 26. The collar element 46 also includes an upper annular plate 54 spaced from the base plate 50 to define therebetween an annular recess 53 about the collar element 46 within which the collar element 48 is received for relative movement rotationally with respect to the collar element 46. The collar element 48 is formed with an outwardly extending mounting lobe 56 configured for attachment to the extending piston end of the steering piston-and-cylinder assembly 42. The collar element 46 has a coupling block 58 pivotably affixed about a vertical axis between the base and upper annular plates 50, 54 and the collar element 48 carries two mating coupling blocks 60 either of which can be selectively bolted to the coupling block 58 on the collar element 46.

The methodology of switching any individual transport assembly 14, 16 between its two "home" positions shown respectively in FIGS. 2A, 2B and 3A, 3B, may thus be readily understood. Initially, the coupling block 58 of the collar element 46 is unbolted from the one of the two coupling blocks 60 on the collar element 48 to which it has theretofore been affixed, whereupon the respective steering piston-and-cylinder assembly 42 is actuated to either extend or retract, as necessary, its respective piston to rotate the collar element 48 relative to the collar element 46 until the other coupling block 60 is abutted with the coupling block 58, whereupon the newly abutting coupling block 58, 60 are bolted together. In such disposition, the piston of the respective piston-and-cylinder assembly 42 will be at or close to either its fully extended or fully retracted disposition. Upon extension or retraction of the piston to move to the midpoint of its full range of movement, the collar element 48 drives the collar element 46 and, in turn, the post 34 and the crawler subframe 26 substantially ninety degrees into the other "home" position thereof. As will be understood, coordinated extension and retraction of the piston-and-cylinder assemblies 42 from either "home" position effects fine steering of the transport assemblies 14, 16 through driving of the collar elements 46 via the collar elements 48.

As can thus be appreciated, the present invention represents a substantial improvement over the known conventional means of adjustable switching of a crawler-type or other like drive assembly between two differing "home" positions. With the present invention, the transport assemblies may be adjustably switched essentially simultaneously in a minimal amount of time, with minimal labor and without any need to manually move the drive assemblies 14, 16. Further, there are no problems or difficulties in aligning the coupling blocks 58, 60 for re-connection at the conclusion of a switching operation. Accordingly, the present invention will substantially improve the flexibility and efficiency in the operation of such paving and other construction apparatus.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A self-propelled construction vehicle having a frame supported on a steerable transport assembly, the steerable transport assembly comprising a ground engaging structure depending from a steering mechanism movable within a defined range relative to a generally vertical steering axis, the steering mechanism comprising an upstanding post integrally coupled to the ground engaging structure for unitary rotation thereof about the steering axis and a steering control assembly comprising a collar assembly coupled to the post and an actuator mounted to the frame and coupled to the collar assembly for driving rotation of the collar assembly and the post selectively in opposite rotational directions, the collar assembly comprising a driving collar element integrally coupled to the actuator and a driven collar element integrally coupled to the post the driving collar element having two coupling locations angularly spaced from one another and the driven collar element having a coupling location adapted for affixation selectively to either of the coupling locations of the driving collar element, the driven collar element being affixable to the driving collar element selectively in a first disposition relative to the driving collar element for orienting the post and the ground engaging the structure for steering the vehicle in a first transport direction and in a second disposition relative to the driving collar element for orienting the post and the ground engaging structure angularly spaced from the first disposition for steering the vehicle in a second transport direction.

2. A sell-propelled construction vehicle according to claim 1, wherein the driving and driven collar elements are disposed for relative rotation about the steering axis between the first and second dispositions when not affixed to one another.

3. A self-propelled construction vehicle according to claim 1, wherein the driving collar element is disposed annularly about the driven collar element.

4. A self-propelled construction vehicle according to claim 1, wherein the ground engaging structure comprises an endless track crawler assembly.

5. A sell-propelled construction vehicle according to claim 1, wherein the actuator is operable in each of the first and second dispositions of the collar elements for driving rotation of the collar assembly within the defined range for steering of the vehicle in a selected one of the transport directions.

6. A self-propelled construction vehicle according to claim 1, wherein the upstanding post is extendable for selectively controlling elevation of the ground engaging structure relative to the frame.

7. A self-propelled construction vehicle according to claim 1, wherein the vehicle further comprises a plurality of the steerable transport assemblies, and a steering control system for coordinated movement thereof.

8. A self-propelled construction vehicle according to claim 1, wherein the vehicle further comprises an arrangement for slip-forming a paving material along a ground surface as the vehicle is steered in a selected one of the transport directions.

9. A self-propelled construction vehicle having a frame supported on a steerable transport means, the steerable transport means comprising a ground engaging means depending from a steering means movable within a defined range relative to a generally vertical steering axis, the steering means comprising an upstanding post integrally coupled to the ground engaging means for unitary rotation thereof about the steering axis and a steering control means comprising a collar means coupled to the post and an actuator means mounted to the frame and coupled to the collar means for driving rotation of the collar means and the post selectively in opposite rotational directions, the collar means comprising a driving means integrally coupled to the actuator means and a driven means integrally coupled to the post, the driving means having two coupling locations angularly spaced from one another and the driven means having a coupling location adapted for affixation selectively to either of the coupling locations of the driving means, the driven means being affixable to the driving means selectively in a first disposition relative to the driving means for orienting the post and the ground engaging means for steering the vehicle in a first transport direction and in a second disposition at relative to the driving means for orienting the post and the ground engaging means angularly spaced from the first disposition for steering the vehicle in a second transport direction.

10. A self-propelled construction vehicle according to claim 9, wherein the vehicle further comprises means for slip-forming a paving material along a ground surface as the vehicle is steered in a selected one of the transport directions.

11. A self-propelled construction vehicle according to claim 9, wherein the driving means and driven means are disposed for relative rotation about the steering axis between the first and second dispositions when not affixed to one another.

12. A self-propelled construction vehicle accordingly to claim 9, wherein the driving means is disposed annularly about the driven means.

13. A self-propelled construction vehicle according to claim 9, wherein the ground engaging means comprises an endless track crawler means.

14. A self-propelled construction vehicle according to claim 9, wherein the actuator means is operable in each of the first and second dispositions of the driving means and the driven means for driving rotation of the collar means within the defined range for steering of the vehicle in a selected one of the transport directions.

15. A self-propelled construction vehicle according to claim 9, wherein the upstanding post is extendable for selectively controlling elevation of the ground engaging means relative to the frame.

16. A self-propelled construction vehicle according to claim 9, wherein the vehicle further comprises a plurality of the steerable transport means and a steering control system for coordinated movement thereof.

* * * * *